(12) United States Patent
Vassallo et al.

(10) Patent No.: US 9,541,659 B2
(45) Date of Patent: Jan. 10, 2017

(54) NOISE REMOVAL FROM 3D SEISMIC REPRESENTATION

(75) Inventors: Massimiliano Vassallo, Brighton (GB); Kurt Eggenberger, Houston, TX (US); Dirk-Jan Van Manen, Redhill (GB); Ali Özbek, Milton (GB)

(73) Assignee: WESTERNGECO L.L.C., Houston, TX (US)

( * ) Notice: Subject to any disclaimer, the term of this patent is extended or adjusted under 35 U.S.C. 154(b) by 617 days.

(21) Appl. No.: 13/612,369

(22) Filed: Sep. 12, 2012

(65) Prior Publication Data

US 2013/0128696 A1 May 23, 2013

Related U.S. Application Data

(60) Provisional application No. 61/561,596, filed on Nov. 18, 2011.

(51) Int. Cl.
  *G01V 1/38* (2006.01)
  *G01V 1/36* (2006.01)

(52) U.S. Cl.
  CPC ............... *G01V 1/362* (2013.01); *G01V 1/364* (2013.01); *G01V 2210/32* (2013.01); *G01V 2210/57* (2013.01)

(58) Field of Classification Search
  CPC ...... G01V 1/38; G01V 1/364; G01V 2210/57; G01V 2210/32
  USPC ................................ 367/21–24, 43
  See application file for complete search history.

(56) References Cited

U.S. PATENT DOCUMENTS

| | | | |
|---|---|---|---|
| 4,672,545 A * | 6/1987 | Lin et al. | 702/16 |
| 4,760,563 A | 7/1988 | Beylkin | |
| 4,884,248 A | 11/1989 | Laster et al. | |
| 4,937,794 A | 6/1990 | Marschall et al. | |
| 5,014,249 A | 5/1991 | Brink | |
| 5,189,644 A | 2/1993 | Wood | |
| 5,293,352 A | 3/1994 | Chambers | |
| 5,448,531 A | 9/1995 | Dragoset, Jr. | |
| 5,818,795 A | 10/1998 | Hawkins et al. | |
| 5,971,095 A | 10/1999 | Özbek | |
| 6,295,505 B1 | 9/2001 | Assa et al. | |
| 6,446,008 B1 | 9/2002 | Özbek | |
| 6,651,007 B2 | 11/2003 | Özbek | |
| 6,668,228 B1 * | 12/2003 | Özbek et al. | 702/17 |
| 6,691,039 B1 | 2/2004 | Wood | |
| 6,721,662 B2 | 4/2004 | Wood | |
| 6,751,559 B2 * | 6/2004 | Fookes et al. | 367/21 |
| 7,239,578 B2 | 7/2007 | Robinson | |
| 7,309,983 B2 | 12/2007 | Freedman | |
| 7,328,108 B2 | 2/2008 | Robertsson et al. | |

(Continued)

OTHER PUBLICATIONS

International Search Report and Written Opinion of PCT Application No. PCT/US2012/065159 dated Mar. 8, 2013: pp. 1-10.

(Continued)

*Primary Examiner* — Ian J Lobo
(74) *Attorney, Agent, or Firm* — Abimbola Bukoye (57) ABSTRACT

A method for removing noise from a three-dimensional representation of seismic data. The method includes receiving seismic data acquired in a seismic survey. The method may organize the acquired seismic data into a three-dimensional representation of the acquired seismic data. The method may then remove a noise from the three-dimensional representation of the acquired seismic data based on at least one criterion.

18 Claims, 4 Drawing Sheets

(56) References Cited

U.S. PATENT DOCUMENTS

| | | | |
|---|---|---|---|
| 7,366,054 | B1 | 4/2008 | Wood |
| 7,561,491 | B2 | 7/2009 | Robinson |
| 7,564,740 | B2 | 7/2009 | Wood |
| 7,591,491 | B2 | 9/2009 | Lizenby et al. |
| 7,751,277 | B2 | 7/2010 | Schonewille |
| 7,817,495 | B2 | 10/2010 | Özbek et al. |
| 7,936,640 | B2 | 5/2011 | Robinson |
| 8,139,440 | B2 | 3/2012 | Ferber et al. |
| 2005/0180262 | A1 | 8/2005 | Robinson |
| 2006/0291328 | A1* | 12/2006 | Robertsson ............. G01V 1/36 367/24 |
| 2008/0221801 | A1 | 9/2008 | Craft et al. |
| 2009/0180351 | A1 | 7/2009 | Paffenholz et al. |
| 2009/0231956 | A1* | 9/2009 | Schonewille ............ G01V 1/36 367/46 |
| 2009/0262602 | A1 | 10/2009 | Robinson |
| 2009/0295167 | A1 | 12/2009 | Clidaras et al. |
| 2010/0027848 | A1 | 2/2010 | Al-Dossary et al. |
| 2010/0211319 | A1 | 8/2010 | van Manen et al. |
| 2010/0211320 | A1 | 8/2010 | Vassallo et al. |
| 2010/0211321 | A1 | 8/2010 | Ozdemir et al. |
| 2010/0211322 | A1 | 8/2010 | Vassallo et al. |
| 2010/0211323 | A1 | 8/2010 | Ozdemir et al. |
| 2010/0274492 | A1 | 10/2010 | Rentsch et al. |
| 2010/0299069 | A1 | 11/2010 | Moore |
| 2011/0096625 | A1 | 4/2011 | Rentsch et al. |
| 2011/0276274 | A1 | 11/2011 | Yu |
| 2012/0089337 | A1 | 4/2012 | Vassallo et al. |

OTHER PUBLICATIONS

Akbulut et al., "OTC 4930: Suppression of Seismic Interference Noise on Gulf of Mexico Data," Offshore Technology Conference, 1985: pp. 303-308.
Gülünay, "Seismic trace interpolation in the Fourier transform domain," Geophysics, Jan.-Feb. 2003, vol. 68 (1): pp. 355-369.
Gülünay, "Two different algorithms for seismic interference noise attenuation," The Leading Edge, Feb. 2008: pp. 176-181.
Gülünay et al., CR1837: Spatial Prediction Filters for Attenuation of Seismic Interference Noise, SEG Expanded Abstracts, 2004: pp. 1-4.
Gülünay et al., "Seismic interference noise attenuation," SEG Int'l Exposition and 74th Annual Meeting, Oct. 2004: pp. 1-4.
Huaien et al., SP 1.2: Attenuation of Marine Coherent Noise, In the 59th Annual International Meeting of Society Exploration Geophysicist, 1989: pp. 112-114.
Karsli et al., "Application of complex-trace analysis to seismic data for random-noise suppression and temporal resolution improvement," Geophysics, May-Jun. 2006, vol. 71(3): pp. V79-V86.
Lie, "Seismic Interference, Filtering Methods and Revised Noise Limits," Advances in Underwater Technology, Ocean Science and Offshore Engineering, Oceanology, 1988, vol. 16: pp. 169-182.
Lynn et al., "Experimental investigation of interference from other seismic crews," Geophysics, Nov. 1987, vol. 52(11): pp. 1501-1524.
Mitchell et al., "Efficient tau-p hyperbolic velocity filtering," Geophysics, May 1990, vol. 55(5): pp. 619-625.
Noponen et al., Attenuation of waterborne coherent noise by application of hyperbolic velocity filtering during the tau-p Transform, Geophysics, Jan. 1986, vol. 51(1): pp. 20-33.
Rajput et al., "Research Communications: Attenuating the seismic interference noise on three-dimensional seismic data by frequency-receiver-shot (f-x-y) prediction filters," Current Science, Aug. 2008, vol. 95(4): pp. 501-504.
Schultz, "Seismic data processing: current industry practice and new directions," Geophysics, Dec. 1985, vol. 50(12): pp. 2452-2457.
Spitz, "Seismic trace interpolation in the F-X domain," Geophysics, Jun. 1991, vol. 56(6): pp. 785-794.
Trad, "Five-dimensional interpolation: Recovering from acquisition constraints," Geophysics, Nov.-Dec. 2009, vol. 74(6): pp. V123-V132.
Xu et al., "Antileakage Fourier transform for seismic data regularization," Geophysics, Jul.-Aug. 2005, vol. 70(4): pp. V87-V95.
Zwartjes et al., "Fourier reconstruction of nonuniformly sampled, aliased seismic data," Geophysics, Jan.-Feb. 2007, vol. 72(1): pp. V21-V32.
Brittan, et al. "Optimizing the removal of seismic interference noise", Feb. 1, 2008, The Leading Edge, Society of Exploration Geophysicists, vol. 27, No. 2., pp. 166-173.
Vassallo, et al., "Matching Pursuit Methods Applied to Multicomponent Marine Seismic Acquisition—The Issue of Crossline Aliasing Introduction", May 23, 2011, 73rd EAGE Conference and Exhibition, pp. 1-5.
Vassallo, et al., "How Multicomponent Data Enable Effective Seismic Interference Elimination from Marine Acquisitions Introduction", Jun. 4, 2012, 74th EAGE Conference and Exhibition, pp. 1-5.
Search Report issued in EP application 12850147.5 on Aug. 28, 2015, 5 pages.
Office Action issued in EP application 12850147.5 on Sep. 9, 2015, 6 pages.
Mallat et al., Matching pursuits with time-freguency dictionaries IEEE Transactions on Signal Processing, vol. 41, No. 12, pp. 3397-3415 (1993).
Vassallo et al., Crossline wavefield reconstruction from multicomponent streamer data: Part 1, Multichannel interpolation by matching pursuit (MIMAP) using pressure and its crossline gradient, Geophysics, SEG Denver 2010, pp. 3594-3598.
Anonymous, "Advanced demultiple for wide-Azimuth data" CGS Veritas: Tau-px-py, Nov. 2010: p. 1.
Donati et al., "Seismic reconstruction using a 3D tau-p tansform", CREWS Reseach Report, 1995, vol. 7: pp. 11-1 to 11-16.
Yu M C, "Seismic interference noice elimination—Multidomain 3D filtering approach", SEG San Antonio 2011 Annual Meeting (5 pages).
McMechan, et al., "Depth filtering of first Breaks and Ground roll", Geophysics, vol. 56, No. 3, Mar. 1991 (7 pages).
International Preliminary Examination report on Patentability issued in the related PCT/US12/65159 dated May 20, 2014 (6 pages).
Dragoset B., Geophysical applications of adaptive noise cancellation. 65th annual international meeting of society of exploration geophysicists, 1995, pp. 1389-1392.
Gulunay, N. and Pattberg, D., Seismic interference noice removal. SEG Expanded Abstracts, 2001, vol. 20, 1989.

* cited by examiner

NOISE REMOVAL FROM 3D SEISMIC REPRESENTATION

CROSS-REFERENCE TO RELATED APPLICATION

This application claims the benefit of U.S. Provisional Patent Application Ser. No. 61/561,596 filed Nov. 18, 2011, which is incorporated herein by reference in its entirety.

BACKGROUND

The following descriptions and examples do not constitute an admission as prior art by virtue of their inclusion within this section.

In a seismic survey, a plurality of seismic sources, such as explosives, vibrators, airguns or the like, may be sequentially activated near the surface of the earth to generate energy (i.e., seismic waves) which may propagate into and through the earth. The seismic waves may be reflected back by geological formations within the earth, and the resultant seismic wavefield may be sampled by a plurality of seismic receivers, such as geophones, hydrophones and the like. Each receiver may be configured to acquire seismic data at the receiver's location, normally in the form of a seismogram representing the value of some characteristic of the seismic wavefield against time. The acquired seismograms or seismic data may be transmitted wirelessly or over electrical or optical cables to a recorder system. The recorder system may then store, analyze, and/or transmit the seismic data. This data may be used to generate an image of subsurface formations in the earth and may also be used to detect the possible presence of hydrocarbons, changes in the subsurface formations and the like.

The receivers may also detect noise generated from one or more seismic sources that are not part of the seismic survey. These noises may distort the acquired seismic data by, for example, overlapping with a main reflected seismic wavefield that is the aim of the survey's measurement. The noises may also reach the receivers from directions that are significantly different with respect to the main reflected seismic wavefield. For example, in a marine seismic survey, the noises may be generated by one or more seismic vessels operating adjacently to the area of survey.

SUMMARY

Described herein are implementations of various technologies and techniques for removing noise from a three-dimensional representation of seismic data. In one implementation, a method for removing noise from a three-dimensional representation of seismic data may include receiving seismic data acquired in a seismic survey. The method may organize the acquired seismic data into a three-dimensional representation of the acquired seismic data. The method may then remove a noise from the three-dimensional representation of the acquired seismic data based on at least one criterion.

In another implementation, the method may organize the acquired seismic data into the three-dimensional representation by constructing the three-dimensional representation of the acquired seismic data using an interpolation process. The interpolation process may include representing a seismic wavefield of the acquired seismic data as a component of the seismic wavefield associated with a one way direction of propagation and determining interpolated components of the seismic wavefield based at least in part on the acquired seismic data and the representation, where the component associated with the one way direction of propagation may be an upgoing or downgoing component of the seismic wavefield. The interpolation process may also include representing the seismic wavefield of the acquired seismic data as a combination of the component of the seismic wavefield associated with the one way direction of propagation and a ghost operator and simultaneously determining interpolated and deghosted components of the seismic wavefield based at least in part on the acquired seismic data and the representation. The interpolation process may also include representing the component of the seismic wavefield associated with the one way direction of propagation as a linear combination of basis functions, determining parameters of the linear combination of basis functions in an iterative sequence of adding a basis function to the existing linear combination of basis functions, and determining coefficients associated with the added basis function.

In a further implementation, the method may remove the noise from the three-dimensional representation while constructing the three-dimensional representation of the acquired seismic data using the interpolation process. The interpolation process may use an iterative sequence in constructing the three-dimensional representation of the acquired seismic data. The method may compare a wavenumber of a basis function to be added to a combined function to a wavenumber associated with the noise at each iteration of the interpolation process and add the basis function to the combined function if the wavenumber of the basis function is not associated with the noise, where scalar weights may be applied to the basis function.

In yet another implementation, the method for removing noise from a three-dimensional representation of seismic data may organize into the three-dimensional representation without using an interpolation process. The at least one criterion used in the method may include a direction of arrival of the noise, an angle of arrival of the noise, a time of arrival of the noise, or combinations thereof. The method may also remove the noise from the three-dimensional representation of the acquired seismic data by applying a spatio-temporal dip filter. Applying the spatio-temporal dip filter may include comparing the least one criterion of two or more consecutive records, matching the two or more consecutive records according to one or more source times, using information from adjacent records to fill gaps in a source associated propagation direction map, and filtering one or more responses using the source associated propagation direction map.

In some embodiments, a computing system is provided that includes at least one processor, at least one memory, and one or more programs stored in the at least one memory, wherein the programs include instructions, which when executed by the at least one processor, may perform any method disclosed herein.

In some embodiments, a computer readable storage medium is provided, which has stored therein one or more programs, the one or more programs including instructions, which when executed by a processor, cause the processor to perform any method disclosed herein.

In some embodiments, a computing system is provided and includes at least one processor, at least one memory, and one or more programs stored in the at least one memory; and means for performing any method disclosed herein.

In some embodiments, an information processing apparatus for use in a computing system is provided, and includes means for performing any method disclosed herein.

Thus, the computing systems and methods disclosed herein may include faster, more efficient methods for seismic interference removal. These computing systems and methods may increase seismic interference removal effectiveness, efficiency, and accuracy. Such methods and computing systems may complement or replace conventional methods for seismic interference removal.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both objects or steps, respectively, but they are not to be considered the same object or step.

The terminology used in the description of the present disclosure herein is for the purpose of describing particular embodiments only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following paragraphs provide a brief summary of various technologies and techniques directed at removing noise from a three-dimensional representation of seismic data in accordance with one or more implementations described herein.

In one implementation, a computer application may receive seismic data acquired by receivers in a seismic survey. The computer application may organize the acquired seismic data into a three-dimensional (3D) representation of the acquired seismic data. In one implementation, the 3D representation reflects the acquired seismic data with respect to an inline (x) direction, a crossline (y) direction, and time.

An interpolation process may be used for the purpose of constructing the 3D representation of the acquired seismic data, where the 3D representation may be substantially unaliased. In one implementation, the interpolation process may include using a generalized matching pursuit (GMP) technique. In another implementation, the interpolation process may include using a multichannel interpolation by matching pursuit (MIMAP) technique.

The computer application may then remove the noise from the 3D representation of the acquired seismic data based on at least one criterion. In one implementation, the noise is removed using a 3D filter. In another implementation, the noise is removed using a frequency-wavenumber filter in the 3D frequency-wavenumber domain.

Sometimes, the noise may include seismic interference signals. As such, the at least one criterion may include the direction of arrival of the seismic interference signals, the angle of arrival of the seismic interference signals, the time of arrival of the seismic interference signals, or combinations thereof.

In a further implementation, the noise may be removed at each iteration of the interpolation process.

One or more implementations of various techniques for removing noise from a three-dimensional representation of seismic data will now be described in more detail with reference to FIGS. 1-4 in the following paragraphs.

Seismic Acquisition

Figure 1:
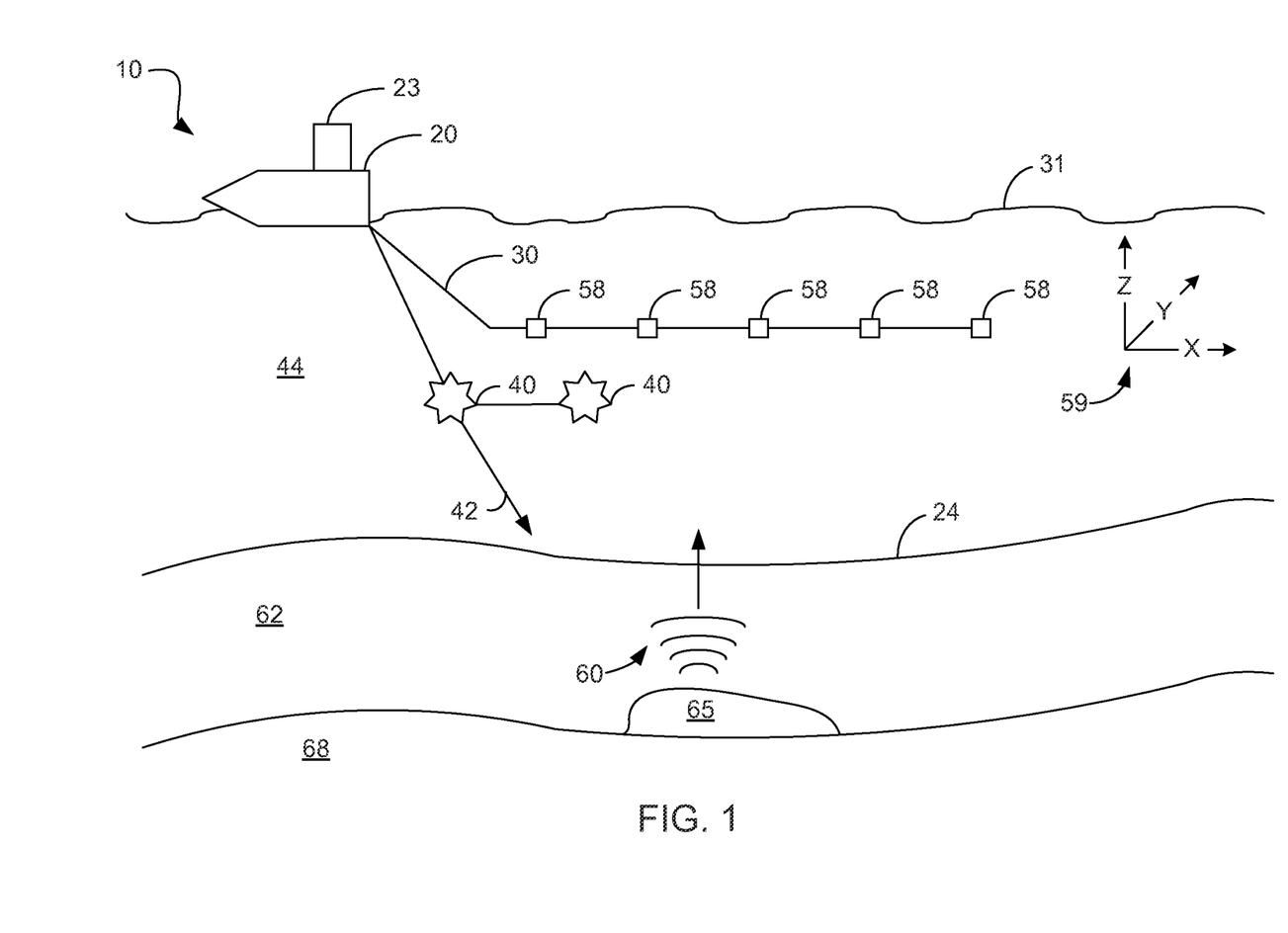
FIG. 1 illustrates a schematic diagram of a marine-based seismic acquisition system in accordance with implementations of various techniques described herein.

FIG. 1 illustrates a schematic diagram of a marine-based seismic acquisition system 10 in accordance with implementations of various techniques described herein. In system 10, survey vessel 20 tows one or more seismic streamers 30 (one streamer 30 being depicted in FIG. 1) behind the vessel 20. In one implementation, streamers 30 may be arranged in a spread in which multiple streamers 30 are towed in approximately the same plane at the same depth. Although various techniques are described herein with reference to a marine-based seismic acquisition system shown in FIG. 1, it should be understood that other marine-based seismic acquisition system configurations may also be used. For instance, the streamers may be towed at multiple planes and/or multiple depths, such as in an over/under configuration. In one implementation, the streamers may be towed in a slanted configuration, where fronts of the streamers are towed shallower than tail ends of the streamers.

Seismic streamers 30 may be several thousand meters long and may contain various support cables, as well as wiring and/or circuitry that may be used to facilitate communication along the streamers 30. In general, each streamer 30 may include a primary cable where seismic sensors 58 that record seismic signals may be mounted. In one implementation, seismic sensors 58 may include hydrophones that acquire pressure data. In another implementation, seismic sensors 58 may include multi-component sensors such that each sensor is capable of detecting a pressure wavefield and at least one component of a particle motion that is associated with acoustic signals that are proximate to the sensor. Examples of particle motions include one or more components of a particle displacement, one or more components (i.e., inline (x), crossline (y) and vertical (z) components (see axes 59)) of a particle velocity and one or more components of a particle acceleration.

Depending on the particular survey need, the multi-component seismic receiver may include one or more hydrophones, geophones, particle displacement sensors, particle velocity sensors, accelerometers, pressure gradient sensors, or combinations thereof. In one implementation, the multi-component seismic sensor may be implemented as a single device, as depicted in FIG. 1, or may be implemented as a plurality of devices. In another implementation, a particular multi-component seismic receiver may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

Marine-based seismic data acquisition system 10 may also include one or more seismic sources 40, such as air guns and the like. In one implementation, seismic sources 40 may be coupled to, or towed by, the survey vessel 20. Alternatively, seismic sources 40 may operate independently of the survey vessel 20 in that the sources 40 may be coupled to other vessels or buoys.

As seismic streamers 30 are towed behind the survey vessel 20, acoustic signals 42, often referred to as "shots," may be produced by seismic sources 40 and are directed down through a water column 44 into strata 62 and 68 beneath a water bottom surface 24. Acoustic signals 42 may be reflected from the various subterranean geological formations, such as formation 65 depicted in FIG. 1.

The incident acoustic signals 42 that are generated by the sources 40 produce corresponding reflected acoustic signals, or pressure waves 60, which may be sensed by seismic sensors 58. In one implementation, pressure waves received and sensed by seismic sensors 58 may include "up going" pressure waves that propagate to the sensors 58 without reflection, as well as "down going" pressure waves that are produced by reflections of the pressure waves 60 from air-water boundary 31.

Seismic sensors 58 generate signals, called "traces," which indicate the acquired measurements of the pressure wavefield and particle motion. The traces (i.e., seismic data) may be recorded and may be processed by signal processing unit 23 deployed on the survey vessel 20.

The goal of the seismic acquisition is to build up an image of a survey area for purposes of identifying subterranean geological formations, such as the exemplary geological formation 65. Subsequent analysis of the image may reveal probable locations of hydrocarbon deposits in subterranean geological formations. Analysis of the image may also be used for other purposes, such as Carbon Capture and Sequestration (CCS), geotechnical applications, and the like. In one implementation, portions of the analysis of the image may be performed on the seismic survey vessel 20, such as by the signal processing unit 23.

A particular seismic source 40 may be part of an array of seismic source elements (such as air guns, for example) that may be arranged in strings (gun strings, for example) of the array. Regardless of the particular composition of the seismic sources, the sources may be fired in a particular time sequence during the survey. Although FIG. 1 illustrates a marine-based seismic acquisition system, the marine-based seismic acquisition system is provided as an example of a seismic acquisition system that may correspond to the methods described herein. However, it should be noted that the methods described herein may also be performed on a land-based seismic acquisition system, a seabed-based seismic acquisition system, or a transition zone-based seismic acquisition system.

The seismic sensors 58 may also receive noise generated by one or more sources not illustrated in FIG. 1. Seismic sources coupled to competitor survey vessels, operating near or in an area of interest for survey vessel 20, may generate seismic interference signals. The seismic interference signals may be sensed by the seismic sensors 58, leading to seismic data containing measurements for both the seismic interference signals and the reflected acoustic signals from sources 40. Removal of the seismic interference signals from the seismic data may allow for more accurate imaging of a survey area for the identification of subterranean geological formations, such as the geological formation 65.

Sometimes, the seismic interference signals may reach the seismic sensors 58 from one or more directions. As an example, the seismic interference signals may reach the seismic sensors 58 from a direction that is significantly different with respect to the reflected acoustic signals from sources 40. Other times, seismic sensors may receive noise associated with ships, rigs, the environment, or combinations thereof.

Removing Noise from a Three-Dimensional Representation of Seismic Data

Figure 2:
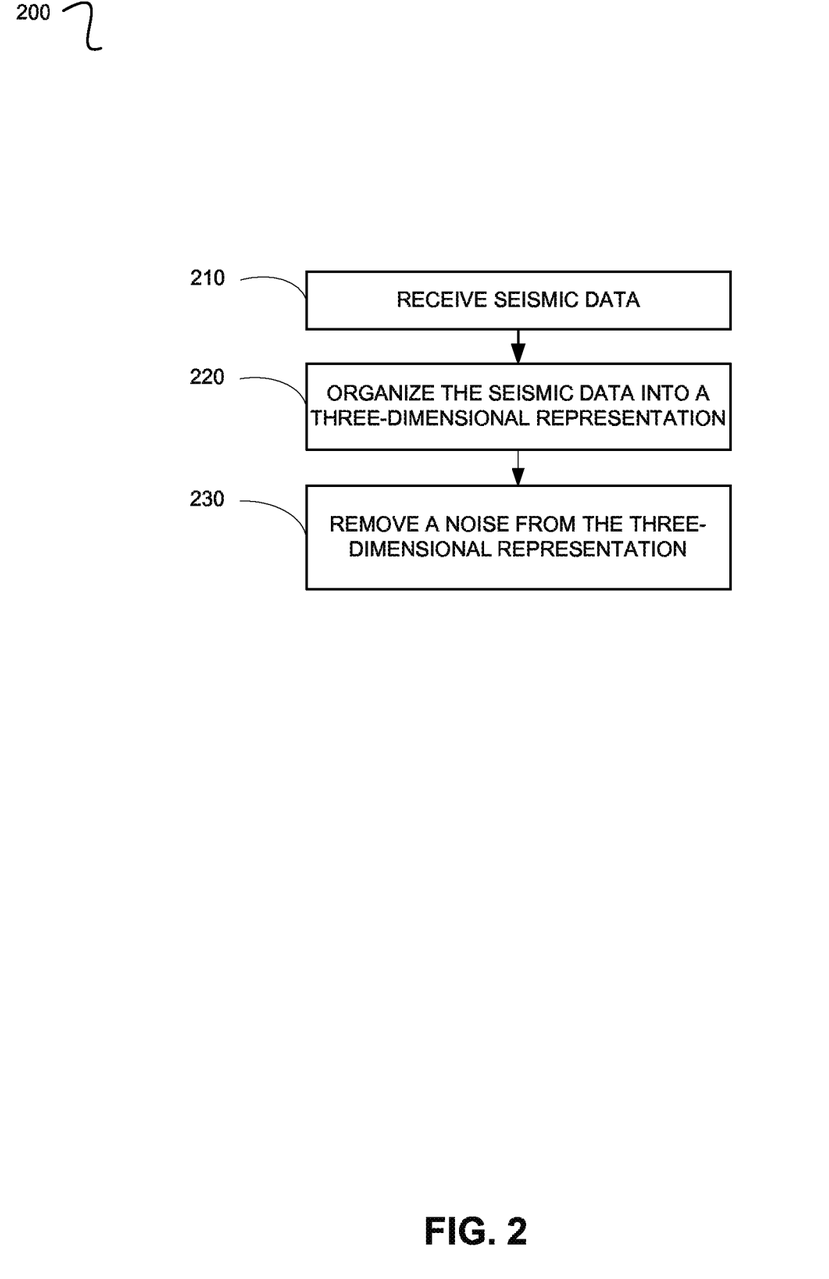
FIG. 2 illustrates a flow diagram of a method for removing noise from a three-dimensional representation of seismic data in accordance with implementations of various techniques described herein.

FIG. 2 illustrates a flow diagram of a method 200 for removing noise from a three-dimensional representation of seismic data in accordance with implementations of various techniques described herein. In one implementation, method 200 may be performed by a computer application. It should be understood that while method 200 indicates a particular order of execution of operations, in some implementations, certain portions of the operations might be executed in a different order.

At block 210, the computer application may receive seismic data acquired by receivers in a seismic survey. In one implementation, the seismic survey may be performed in a manner as described above with reference to FIG. 1. The acquired seismic data may be single-component data or multi-component data.

At block 220, the computer application may organize the acquired seismic data into a three-dimensional (3D) representation of the acquired seismic data. The 3D representation may reflect the acquired seismic data with respect to an inline (x) direction, a crossline (y) direction, and time.

In one implementation, and with reference to FIG. 1, a towed marine seismic survey may have a spread of streamers 30 that are spaced apart in the crossline (y) direction, which means that the seismic sensors are rather sparsely spaced apart in the crossline direction, as compared to the inline (x) spacing of the seismic sensors. As such, the seismic wavefield may be relatively densely sampled in the inline (x) direction while being sparsely sampled in the crossline direction to such a degree that the sampled seismic wavefield may be aliased in the crossline direction. In other words, the data acquired from the seismic sensors may not, in general, contain sufficient information to produce a substantially unaliased construction (i.e., a substantially unaliased continuous interpolation) of the seismic wavefield in the crossline direction. As an example, the seismic spread may contain pressure and particle velocity sensors, which have an associated sparse crossline spacing. Therefore, the seismic data that are acquired by each type of sensor individually may not be sufficient to reconstruct the substantially unaliased seismic wavefield in the crossline direction. In such a scenario, an interpolation process may be used to construct the 3D representation of the acquired seismic data, so that the 3D representation may be substantially unaliased.

In one implementation, the interpolation process is applied to acquired single component seismic data. In another implementation, the interpolation process may include using a multichannel interpolation by matching pursuit (MIMAP) technique on acquired multi-component seismic data, as described in commonly assigned U.S. patent application Ser. No. 12/602,816 entitled METHOD OF REPRESENTING SEISMIC DATA, which is incorporated herein by reference in its entirety. In yet another implementation described in more detail in a later section, the interpolation process may include using a generalized matching pursuit (GMP) technique on acquired multi-component seismic data.

In a further implementation, a seismic wavefield may be relatively densely sampled in more than one spatial direction, including the inline (x) direction and the crossline (y) direction, to such a degree that the sampled seismic wavefield is substantially unaliased when acquired. In other words, the seismic data acquired from the seismic sensors may, in general, contain sufficient information to produce a substantially unaliased construction of the seismic wavefield. In such a scenario, because the acquired seismic data is already substantially unaliased, interpolation may not be needed to organize the seismic data into the 3D representation of the seismic data.

At block 230, the computer application may remove a noise from the 3D representation of the acquired seismic data based on at least one criterion, where the 3D representation may be substantially unaliased. In one implementation, the noise is removed using a 3D filter. In another implementation, the noise is removed using a frequency-wavenumber filter in the 3D frequency-wavenumber domain.

Sometimes, the noise may include seismic interference signals. As such, the at least one criterion may include the direction of arrival of the seismic interference signals, the angle of arrival of the seismic interference signals, the time of arrival of the seismic interference signals, or combinations thereof. In one implementation, the computer application may have information associated with the at least one criterion, such as the direction of arrival of the seismic interference signals, the angle of arrival of the seismic interference signals, the time of arrival of the seismic interference signals, or combinations thereof.

In another implementation, the computer application may determine the at least one criterion. As described in more detail in a later section, a method using spatio-temporal dip filters may be used to determine the at least one criterion and remove the noise from the 3D representation.

In a further implementation of method 200, and as described in more detail in a later section, blocks 220 and 230 may be performed together, such that the noise may be removed at each iteration of an interpolation process.

Figure 3:
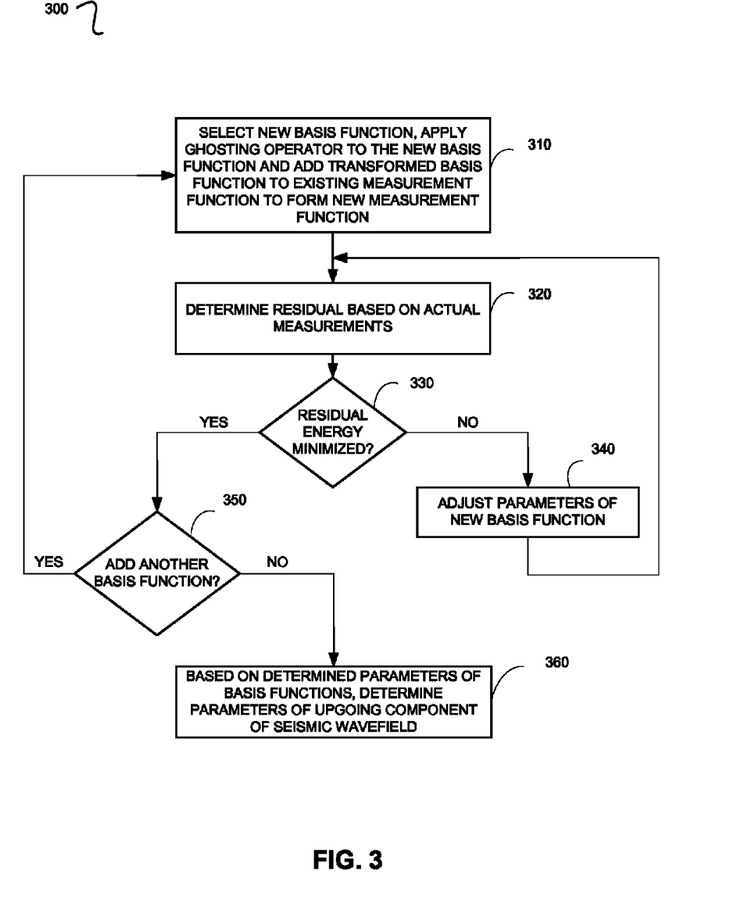
FIG. 3 illustrates a flow diagram of a method for using a generalized matching pursuit technique in accordance with implementations of various techniques described herein.

Using an Interpolation Process to Construct a 3D Representation of the Seismic Data FIG. 3 illustrates a method for using an interpolation process to construct a 3D representation of acquired seismic data that may be implemented in accordance with various techniques described herein.

Using a Generalized Matching Pursuit Technique

Referring back to step 220, an interpolation process may be used for the purpose of constructing a 3D representation of the acquired seismic data, where the interpolation process includes using a generalized matching pursuit (GMP) technique on acquired multi-component seismic data, as described in commonly assigned U.S. patent application Ser. No. 12/131,870 entitled JOINTLY INTERPOLATING AND DEGHOSTING SEISMIC DATA, now issued U.S. Pat. No. 7,817,495, which is incorporated herein by reference and described herein.

Down going pressure waves create an interference known as "ghosts". Depending on the incidence angle of the up going wavefield and the depth of the streamer 30 as shown in FIG. 1, the interference between the up going and down going wavefields creates nulls, or notches, in the recorded spectrum. These notches may reduce the useful bandwidth of the spectrum and may limit the possibility of towing the streamers 30 in relatively deep water (water depth greater than 20 meters (m), for example).

The technique of decomposing the recorded wavefield into up and down going components is often referred to as wavefield separation, or "deghosting." The particle motion data that are provided by the multi-component seismic sensors 58 allows the recovery of "ghost" free data, which means data that are indicative of the upgoing wavefield.

Accordingly, various techniques and systems are described herein that jointly interpolate and deghost acquired seismic data. More specifically, based on the measurements that are acquired by the multi-component sensors, an upgoing component of the pressure wavefield (herein called "$p_u(x,y;z_s,f)$") component is determined at the seismic sensor locations, as well as at locations other than the sensor locations, without first interpolating the acquired seismic data and then deghosting the interpolated data (or vice versa).

The upgoing pressure wave component $p_u(x,y;z_s,f)$ at a temporal frequency f and cable depth $z_s$ may, in general, be modeled as a continuous signal as the sum of J sinusoids that have complex amplitudes (called "$A_j$"), as set forth below:

$$p_u(x, y; z_s, f) = \sum_{j=1}^{J} A_j e^{j2\pi(k_{x,j}x + k_{y,j}y + k_{z,j}z_s)}. \quad \text{Equation 1}$$

In Equation 1, "$k_{x,j}$" represents the inline wavenumber for index j; "$k_{y,j}$" represents the crossline wavenumber for index j; "$z_s$" represents the streamer tow depth; "f" represents the temporal frequency of the sinusoids; and "c" represents the acoustic velocity in water. Additionally, "$k_{z,j}$," the wavenumber in the vertical, or depth, direction may be described as follows:

$$k_{z,j} = f/c \sqrt{1 - c^2(k_{x,j}^2 + k_{y,j}^2)/f^2}. \quad \text{Equation 2}$$

Based on the representation of the upgoing pressure component $p_u(x,y;z_s,f)$ in Equation 3, the pressure and particle motion measurements may be represented as continuous signals described below:

$$m^P(x, y; z_s, f) = \sum_{j=1}^{P} A_j H(k_{x,j}, j_{y,j}; z_s, f) e^{j2\pi(k_{x,j}x + k_{y,j}y + k_{z,j}z_s)}, \quad \text{Equation 3}$$

where "$m^P(x,y;z_s,f)$" represents a measurement vector, which includes the pressure and orthogonal components of the particle velocity in the inline, crossline and vertical coordinates, respectively. Thus, the measurements of the vector $m^P(x,y;z_s,f)$ are contiguous. In one implementation, any subset of $k_{x,j}$, $k_{y,j}$, $z_s$, and f may be used as input. In another implementation, any subset of $k_{x,j}$, $k_{y,j}$, $z_s$, and f may be used as models.

The measurement vector $m^P(x,y;z_s,f)$ may be described as follows:

$$m^P(x,y;z_s,f) = [p^P(x,y;z_s,f) v_x^P(x,y;z_s,f) v_y^P(x,y;z_s,f) v_z^P(x,y;z_s,f)]^T, \quad \text{Equation 4}$$

where "$H(k_x,k_y;z_s,f)$" represents a ghosting operator, which is defined as follows:

$$H(k_x, k_y; z_s, f) = \left[ (1 + \xi e^{j4\pi k_z z_s}) \quad \frac{ck_x}{f}(1 + \xi e^{j4\pi k_z z_s}) \quad \frac{ck_y}{f}(1 + \xi e^{j4\pi k_z z_s}) \quad \frac{ck_z}{f}(1 - \xi e^{j4\pi k_z z_s}) \right]^T. \quad \text{Equation 5}$$

In Equation 5, "$z_s$" represents the streamer depth; and "$\xi$" represents the reflection coefficient of the sea surface.

Due to the relationships set forth in Equations 1 and 3, the $A_j$ parameters may be determined for purposes of jointly interpolating the acquired seismic data and determining the upgoing pressure component $p_u(x,y;z_s,f)$.

Equations 1 and 3 define the upgoing pressure component $p_u(x,y;z_s,f)$ and measurement vector $m^P(x,y;z_s,f)$ as a combination of sinusoidal basis functions. However, it is noted that the component $p_u(x,y;z_s,f)$ and the measurement vector $m^P(x,y;z_s,f)$ may be represented as a combination of other types of basis functions, in accordance with other implementations of various techniques described herein.

If the sinusoids in Equation 3 were not subject to the ghosting operators, then a matching pursuit technique could be used to identify the parameters of the sinusoids. The matching pursuit technique is generally described in S. Mallat and Z. Zhang Mallat "Matching pursuits with time-frequency dictionaries" IEEE Transactions on Signal Processing, vol. 41, no. 12, pp. 3397-3415 (1993). The matching pursuit algorithm may be regarded as an iterative algorithm, which expands a particular signal in terms of a linear combination of basis functions. As described herein, the matching pursuit algorithm is generalized to the cases where the signal is represented as a linear combination of basis functions that are subject to some linear transformation, e.g., the deghosting operation. This generalized technique described herein is referred to as the GMP algorithm.

FIG. 3 illustrates a flow diagram of a method 300 for using a GMP technique in accordance with implementations of various techniques described herein. The method 300 may be used for purposes of determining the coefficients of Equations 1 and 3. In this regard, the method 300 includes, pursuant to block 310, selecting a new basis function, applying the ghosting operator $H(k_x,k_y;z_s,f)$ to the new basis function and adding the transformed basis function to an existing measurement function to form a new measurement function. After the first basis function (which may be in the simplest form a single sinusoidal function or even a constant) is added, a new exponential is added at each iteration to the set of basis functions used, and the corresponding "ghosted" basis function is added to the representation; and then, an error, or residual, is determined based on the actual seismic data that are acquired by the sensor measurements, pursuant to block 320.

The residual energy is then minimized for purposes of determining the $A_j$ parameters for the new basis function. More specifically, a determination is made (diamond 330) whether the residual energy has been minimized with the current parameters for the new basis function. If not, the parameters are adjusted and the residual energy is again determined, pursuant to block 320. Thus, a loop is formed for purposes of minimizing some metric of the residual energy until a minimum value is determined, which permits the coefficients for the next basis function to be determined. Therefore, pursuant to diamond 350, if another basis function is to be added (based on a predetermined limit of basis functions, for example), the method 300 continues with block 310 to add the next basis function and calculate the corresponding parameters. Otherwise, if no more basis functions are to be added, the upgoing component of the seismic event is determined, pursuant to block 360.

As a more specific example, the $A_j$ parameters for the newest basis function may be determined by minimizing the energy of the residual. Therefore, if P-1 basis functions have been determined previously, the representation of the component $p_u(x,y;z_s,f)$ with the P-1 sinusoids may be as follows:

$$p_u(x, y; z_s, f) = \sum_{j=1}^{P-1} A_j e^{j2\pi(k_{x,j}x + k_{y,j}y + k_{z,j}z_s)}. \quad \text{Equation 6}$$

The corresponding measurement function for the P-1 basis functions may be obtained by applying the ghost operators to the basis functions:

$$m^{P-1}(x, y; z_S, f) \approx \quad \text{Equation 7}$$

$$\sum_{j=1}^{P-1} A_j H(k_{x,j}, k_{y,j}; z_S, f) e^{j2\pi(k_{x,j}x + k_{y,j}y + k_{z,j}z_S)}$$

The residual in the approximation, called "$r^{P-1}(x,y;z_s,f)$" may be defined as follows:

$$r^{P-1}(x, y; z_S, f) = m(x, y; z_S, f) - \quad \text{Equation 8}$$

$$\sum_{j=1}^{P-1} A_j H(k_{x,j}, k_{y,j}; z_S, f) e^{j2\pi(k_{x,j}x + k_{y,j}y + k_{z,j}z_S)}.$$

If a new basis function $$\text{``}\overline{A}_P e^{j2\pi(\overline{k}_{x,P}x + \overline{k}_{y,P}y + \overline{k}_{z,P}z_S)}\text{,''}$$

which has a corresponding coefficient called "$\overline{A}_P$" is added to the existing representation of the upgoing wavefield, then the residual may be rewritten as follows:

$$r^P_{(\overline{A}_P, \overline{k}_{x,P}, \overline{k}_{y,P})}(x,y;z_s,f) = r^{P-1}(x,y;z_s,f) - \overline{A}_P H(\overline{k}_{x,P}, \overline{k}_{y,P}; z_s, f) e^{j2\pi(\overline{k}_{x,P}x + \overline{k}_{y,P}y + \overline{k}_{z,P}z_S)}. \quad \text{Equation 9}$$

It is noted that for Equation 9, the parameters $\overline{A}_P$, $\overline{k}_{x,P}$, $\overline{k}_{y,P}$ or the new basis function term are determined. In one implementation, the new basis function term may be solved along a single spatial direction, where only a subset of the parameters $\overline{A}_P$, $\overline{k}_{x,P}$, $\overline{k}_{y,P}$ may be determined. For example, the new basis function term may be solved along the y-direction, such that only the parameters $\overline{A}_P$ and $\overline{k}_{y,P}$ of the new basis function are determined.

As a specific example, the parameters of the new basis function may be found by minimizing some metric of the residual, which is calculated over inline and crossline sensor locations, as described below:

$$(\overline{k}_{x,P}, \overline{k}_{y,P}, \overline{A}_P) = \arg \min_{(\overline{A}_P, \overline{k}_{x,P}, \overline{k}_{y,P})} M(\overline{A}_P, \overline{k}_{x,P}, \overline{k}_{y,P}; z_s, f), \quad \text{Equation 10}$$

One such example metric may be described as follows:

$$M(\overline{A}_P, \overline{k}_{x,P}, \overline{k}_{y,P}; z_s, f) = \sum_{m,n} \left( r^P_{(\overline{A}_P, \overline{k}_{x,P}, \overline{k}_{y,P})}(x, y; z_s, f) \right)^H \quad \text{Equation 11}$$

$$C^{-1} r^P_{(\overline{A}_P, \overline{k}_{x,P}, \overline{k}_{y,P})}(x, y; z_s, f),$$

where "C" represents a four by four positive definite matrix; "$x_m$" represents the sensor locations in the inline direction; and "$y_n$" represents the sensor locations in the crossline direction.

Using a Method with Spatio-Temporal Dip Filters to Determine the Criterion and Remove the Noise from the 3D Representation Referring back to block 230, a method using spatio-temporal dip filters may be used to determine the at least one criterion and remove the noise from the 3D representation, as described in commonly assigned U.S. patent application Ser. No. 12/906,532 entitled METHODS TO PROCESS SEISMIC DATA CONTAMINATED BY COHERENT ENERGY RADIATED FROM MORE THAN ONE SOURCE, which is incorporated herein by reference and described herein.

In an implementation where at least one criterion such as the direction of arrival of seismic interfering signals is needed, i.e., incidence angles or slowness vector components and azimuths, various methods can be used to determine the at least one criterion in a spatio-temporal variant manner. Further, using the direction of arrival, a spatio-temporal dip-model of the seismic interfering signals can be derived and used in a spatio-temporal dip-filter.

In case mainly individual record gathers are taken into account, a guiding mask of expected directions of arrival such as spatio-temporal propagation may be built using e.g., source and receiver geometry. This spatio-temporal mask can then be used to filter the data, e.g., a spatio-temporal dip filter.

In one implementation, additional information from adjacent record gathers can be incorporated using the following process.

First, incidence angle and azimuth maps of two or more consecutive records are compared, taking into account at least the source times of reflected acoustic signals from one's own sources by matching the maps according to one source time or another. Coherent propagation directions present at similar time and space are associated with the source used to align the acquired seismic data.

Second, spatio-temporal propagation directions that are present in the source-time-matched propagation direction maps are identified and associated with the corresponding source. More specifically, the propagation directions for each sample in a record with a window of samples in time and space around the matching sample in adjacent records are compared. If the propagation direction of a sample (in space and the source specific aligned time) is consistent in adjacent records, it is associated to the source used to match the maps and output a propagation direction map associated with the individual source.

Third, information from adjacent records is used to fill gaps in the source associated propagation direction map. Alternatively, interpolation techniques may be applied to fill the gaps.

Fourth, the acquired seismic data is filtered using the source associated maps of propagation directions (e.g., spatio-temporal dip filters). Other filters which are based on a spatio-temporal variant directional propagation attribute, such as azimuths and dips, may be used.

Removing Noise at Each Iteration of an Interpolation Process

As noted earlier, blocks 220 and 230 of FIG. 2 may be performed together, such that noise may be removed at each iteration of an interpolation process.

In certain implementations, an interpolation process may use an iterative sequence in constructing a three-dimensional representation of acquired seismic data. For example, as described earlier and illustrated in FIG. 3, an interpolation process using a GMP technique may select a new basis function, apply a ghosting operator to the new basis function, and add the transformed basis function to an existing measurement function to form a new combined function.

In one implementation of an interpolation process using an iterative sequence, a seismic interference mask may be checked against a wavenumber of a basis function that is to be added to a combined function. In one implementation of using a seismic interference mask, the wavenumber of the basis function to be added is compared with a wavenumber associated with seismic interference signals with a known direction of arrival. If the wavenumber of the basis function is not recognized as seismic interference, it is added to the combined function. If the wavenumber of the basis function is recognized as seismic interference, the basis function is not added to the combined function. The resulting combined function would be used to produce a reliable estimate of the seismic wavefield that would have been acquired in the absence of the seismic interference signals.

In a further implementation of the seismic interference mask, a scalar weighting is applied to the basis functions. For example, a basis function that is associated with seismic interference would have a weight of 0 applied to it, and a basis function not associated with seismic interference would have a weight of 1 applied to it. However, any numerical values may be used as scalar weights.

Computing Systems

Figure 4:
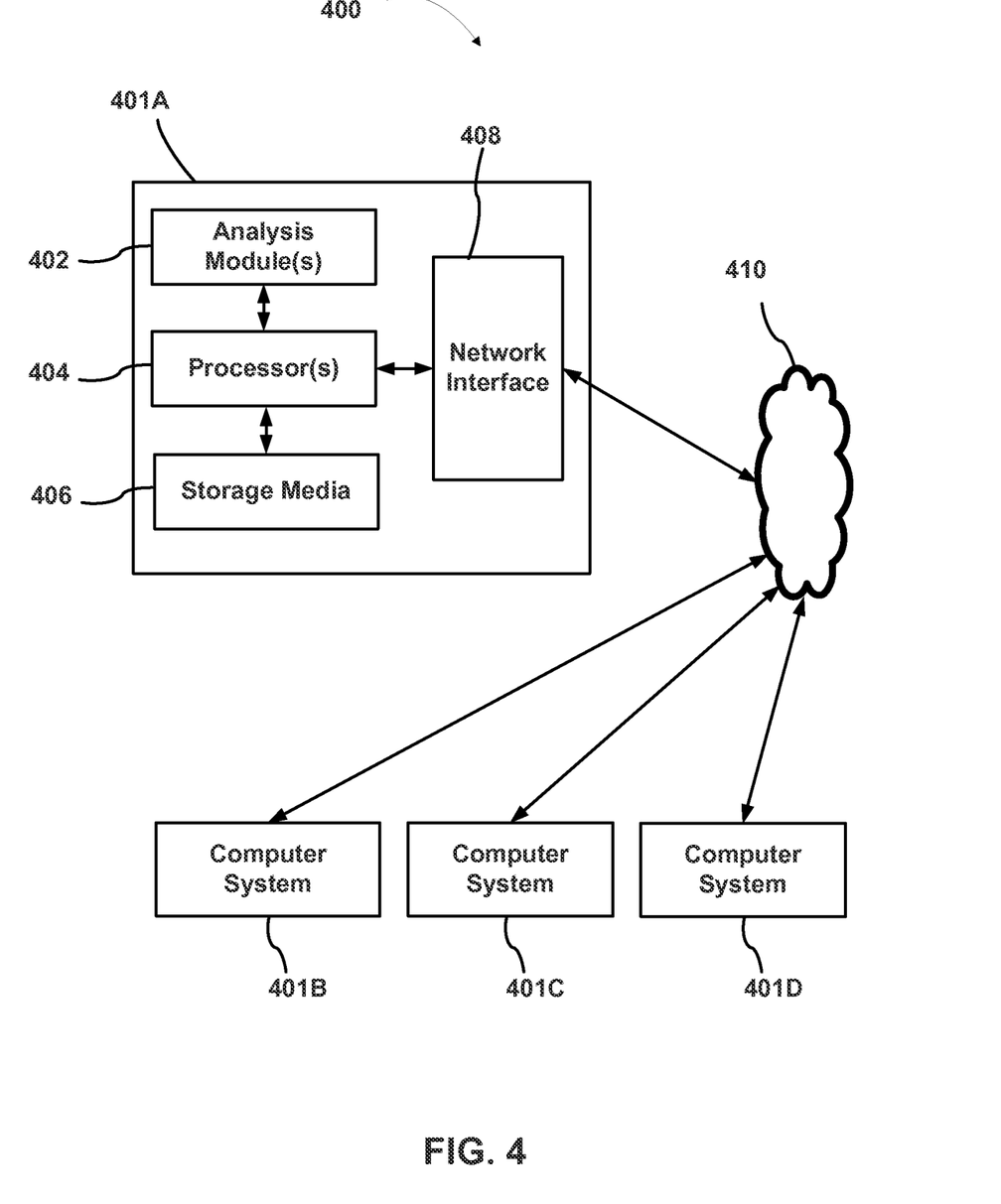
FIG. 4 illustrates an example computing system in accordance with implementations of various techniques described herein.

FIG. 4 illustrates an example computing system 400 in accordance with implementations of various techniques described herein. The computing system 400 can be an individual computer system 401A or an arrangement of distributed computer systems. The computer system 401A includes one or more analysis modules 402 that are configured to perform various tasks according to some embodiments, such as the methods and techniques disclosed herein. To perform these various tasks, analysis module 402 executes independently, or in coordination with, one or more processors 404, which is (or are) connected to one or more storage media 406. The processor(s) 404 is (or are) also connected to a network interface 408 to allow the computer system 401A to communicate over a data network 410 with one or more additional computer systems and/or computing systems, such as 401B, 401C, and/or 401D (note that computer systems 401, 401C and/or 401D may or may not share the same architecture as computer system 401A, and may be located in different physical locations, e.g., computer systems 401A and 401B may be on a ship underway on the ocean, while in communication with one or more computer systems such as 401C and/or 401D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 406 can be implemented as one or more computer-readable or machine-readable storage media. Note that while in the exemplary embodiment of FIG. 4 storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 400 is only one example of a computing system, and that computing system 400 may have more or fewer components than shown, may combine additional components not depicted in the exemplary embodiment of FIG. 4, and/or computing system 400 may have a different configuration or arrangement of the components depicted in FIG. 4. The various components shown in FIG. 4 may be implemented in hardware, software, or a combination of both hardware and software, including one or more signal processing and/or application specific integrated circuits.

Further, the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention. In one implementation of the methods described herein, noise from different sources can be removed simultaneously. For example, more than one direction of arrival can be addressed at once.

As those with skill in the art will appreciate, the techniques and methods of the disclosed embodiments provide for the automation of seismic interference identification and/or removal, e.g., if competitor vessel positions (which are routinely mapped) are available, use of the techniques and methods of the disclosed embodiments could be used to reduce user interaction for seismic interference identification and removal.

Further, as those with skill in the art will appreciate, the techniques and methods of the disclosed embodiments, particularly when used on a shot-by-shot basis, can be implemented on board a vessel that is underway while acquisition is ongoing, and in a realtime or near-realtime fashion While certain implementations have been disclosed in the context of seismic data collection and processing, those with skill in the art will recognize that the disclosed methods can be applied in many fields and contexts where data involving structures arrayed in a three-dimensional space may be collected and processed, e.g., medical imaging techniques such as tomography, ultrasound, MRI and the like, SONAR and LIDAR imaging techniques and the like.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
receiving seismic data acquired in a seismic survey using seismic sensors;

organizing the acquired seismic data into a three-dimensional representation of the acquired seismic data, comprising:
constructing the three-dimensional representation of the acquired seismic data using an interpolation process, wherein the three-dimensional representation is substantially unaliased with respect to at least a crossline direction, wherein the interpolation process comprises:
determining a measurement function representing the acquired seismic data, the measurement function comprising basis functions;
selecting a new basis function;
applying a ghosting operator to the new basis function to generate a transformed basis function; and
adding the transformed basis function to the measurement function; and
based on at least one criterion, removing noise from the three-dimensional representation of the acquired seismic data.

2. The method of claim 1, wherein the interpolation process comprises:
representing a seismic wavefield of the acquired seismic data as a component of the seismic wavefield associated with a one way direction of propagation; and
determining interpolated components of the seismic wavefield based at least in part on the acquired seismic data and the representation.

3. The method of claim 2, further comprising:
representing the seismic wavefield of the acquired seismic data in the measurement function as a combination of the component of the seismic wavefield associated with the one way direction of propagation and the ghost operator; and
simultaneously determining interpolated and deghosted components of the seismic wavefield based at least in part on the acquired seismic data and the representation.

4. The method of claim 2, wherein the measurement function comprises a linear combination of the basis functions.

5. The method of claim 4, wherein determining comprises determining parameters of the linear combination of basis functions in an iterative sequence of adding a basis function to the existing linear combination of basis functions, and determining coefficients associated with the added basis function.

6. The method of claim 2, wherein the component of the seismic wavefield associated with the one way direction of propagation comprises an upgoing component of the seismic wavefield.

7. The method of claim 2, wherein the component of the seismic wavefield associated with the one way direction of propagation comprises a downgoing component of the seismic wavefield.

8. The method of claim 1, wherein removing the noise from the three-dimensional representation is performed while constructing the three-dimensional representation of the acquired seismic data using the interpolation process.

9. The method of claim 8, wherein the interpolation process uses an iterative sequence in constructing the three-dimensional representation of the acquired seismic data.

10. The method of claim 9, further comprising:
at each iteration of the interpolation process, comparing a wavenumber of a basis function to be added to a combined function to a wavenumber associated with the noise; and
adding the basis function to the combined function if the wavenumber of the basis function is not associated with the noise.

11. The method of claim 10, wherein adding the basis function to the combined function if the wavenumber of the basis function is not associated with the noise comprises applying scalar weights to the basis function.

12. The method of claim 1, wherein removing the noise from the three-dimensional representation of the acquired seismic data comprises applying a spatio-temporal dip filter.

13. The method of claim 12, wherein applying the spatio-temporal dip filter comprises:
comparing the least one criterion of two or more consecutive records;
matching the two or more consecutive records according to one or more source times;
using information from adjacent records to fill gaps in a source associated propagation direction map; and
filtering one or more responses using the source associated propagation direction map.

14. The method of claim 1, wherein the at least one criterion comprises a direction of arrival of the noise, an angle of arrival of the noise, a time of arrival of the noise, or combinations thereof.

15. The method of claim 1, wherein using the interpolation process further comprises:
determining a residual energy by comparing the measurement function with the acquired seismic data; and
selecting a coefficient for the transformed basis function in the measurement function to minimize the residual energy.

16. A non-transitory computer-readable medium having stored thereon computer-executable instructions which, when executed by a computer, cause the computer to:
receive seismic data acquired in a seismic survey using seismic sensors;
organize the acquired seismic data into a three-dimensional representation of the acquired seismic data, comprising:
construct the three-dimensional representation of the acquired seismic data using an interpolation process, wherein the three-dimensional representation is substantially unaliased with respect to at least a crossline direction, wherein the interpolation process comprises:
determining a measurement function representing the acquired seismic data, the measurement function comprising basis functions;
selecting a new basis function;
applying a ghosting operator to the new basis function to generate a transformed basis function; and
adding the transformed basis function to the measurement function; and
based on at least one criterion, remove noise from the three-dimensional representation of the acquired seismic data.

17. The non-transitory computer-readable medium of claim 16, wherein the three-dimensional representation of the acquired seismic data reflects the acquired seismic data with respect to an inline direction, the crossline direction, and time.

18. A computer system, comprising:
a processor; and
a memory comprising program instructions executable by the processor to:
receive seismic data acquired in a seismic survey using seismic sensors;

organize the acquired seismic data into a three-dimensional representation of the acquired seismic data, comprising:
construct the three-dimensional representation of the acquired seismic data using an interpolation process, wherein the three-dimensional representation is substantially unaliased with respect to at least a crossline direction, wherein the interpolation process comprises:
determining a measurement function representing the acquired seismic data, the measurement function comprising basis functions;
selecting a new basis function;
applying a ghosting operator to the new basis function to generate a transformed basis function;
adding the transformed basis function to the measurement function; and
based on at least one criterion, remove one or more seismic interference signals from the three-dimensional representation of the acquired seismic data.

\* \* \* \* \*